United States Patent [19]

Shackleton et al.

[11] 4,343,710

[45] Aug. 10, 1982

[54] FILTER PRESSES AND A METHOD OF CLEANING SAME

[76] Inventors: Ronald Shackleton, Broad Oak, Park Rd., Disley, Stockport SK12 2NA; Christopher J. Woodruff, 17 Meadway, Mottram Rise, Stalybridge, Cheshire, both of England; Ian M. Fletcher, Regency Manor, 2153 C. Bedell Rd., Grand Island, N.Y. 14070

[21] Appl. No.: 183,799

[22] Filed: Sep. 4, 1980

[30] Foreign Application Priority Data

Sep. 4, 1979 [GB] United Kingdom ................. 7930555

[51] Int. Cl.³ ............................................. B01D 25/32
[52] U.S. Cl. .................................... 210/797; 210/143; 210/225
[58] Field of Search ...................... 210/22 S, 193, 791, 210/793, 794, 796, 797, 143, 798

[56] References Cited

U.S. PATENT DOCUMENTS

| | | | |
|---|---|---|---|
| 2,418,153 | 4/1947 | Barnett | 210/225 |
| 3,015,395 | 1/1962 | Stram et al. | 210/225 |
| 3,471,024 | 10/1969 | Dorset | 210/225 |
| 3,501,060 | 3/1970 | Pfeuffer | 210/193 |
| 3,679,052 | 7/1972 | Asper | 210/193 |
| 4,089,781 | 5/1978 | Asp | 210/797 |
| 4,107,037 | 8/1978 | Cavanaugh et al. | 210/791 |
| 4,107,042 | 8/1978 | Heinrich | 210/225 |
| 4,173,535 | 11/1979 | Nakashima et al. | 210/225 |
| 4,201,672 | 5/1980 | Kenyon | 210/225 |
| 4,213,861 | 7/1980 | Muller et al. | 210/797 |

Primary Examiner—Ernest G. Therkorn
Attorney, Agent, or Firm—Sughrue, Mion, Zinn, Macpeak & Seas

[57] ABSTRACT

A filter press comprises a series of plates and frames separated by filtering sheets into which a liquid to be filtered can be fed via at least two inlet pipes. An outlet pipe is provided to enable filtrate to egress from the press leaving the filtered residue behind in the frames. In order to clean the press, valve means are provided to close off the outlet pipe and to isolate the inlet pipes from each other. A cleaning liquid can then be fed into one of the inlet pipes to pass into the frames and flush out the filtered out residue therefrom via the other inlet pipe.

15 Claims, 9 Drawing Figures

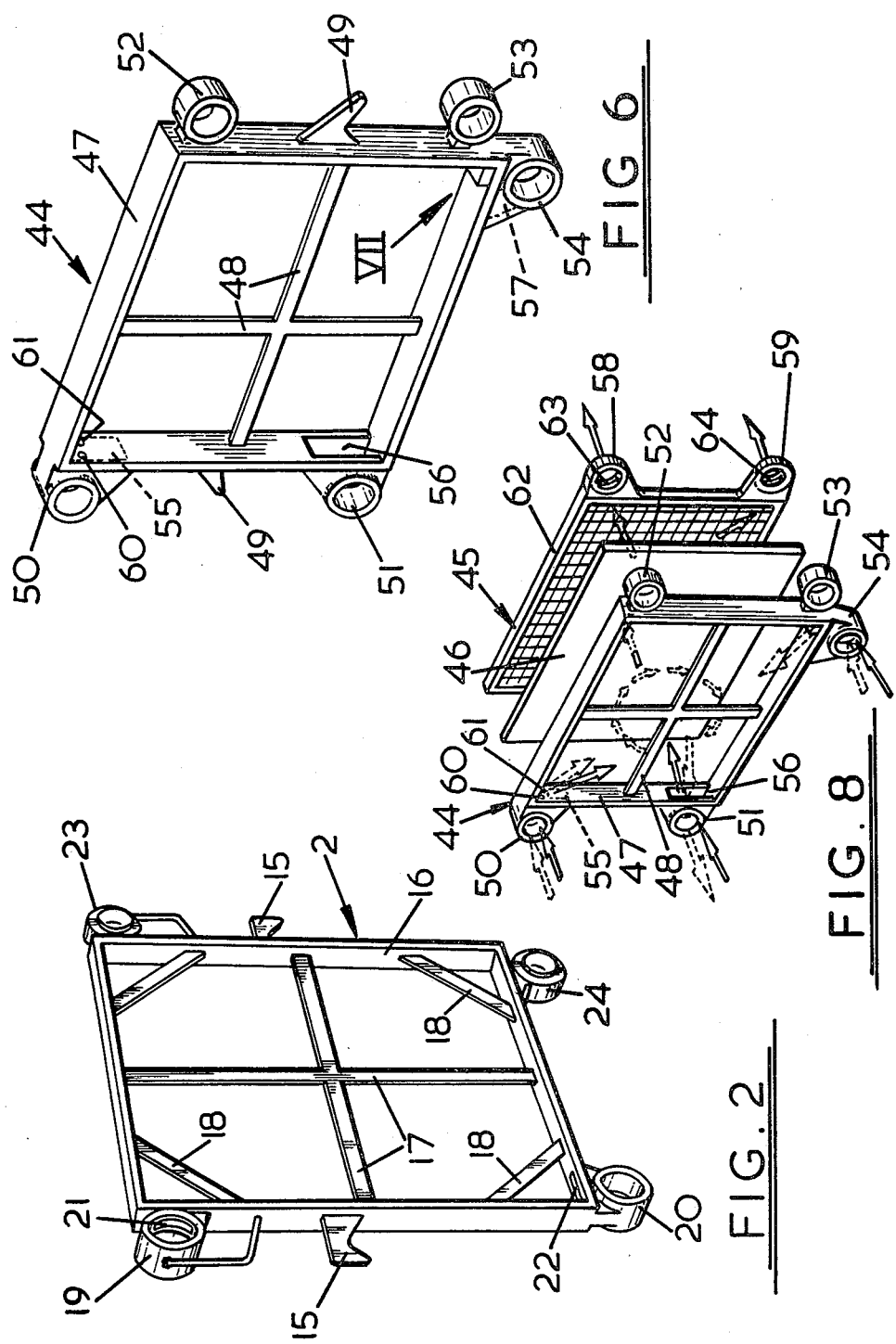

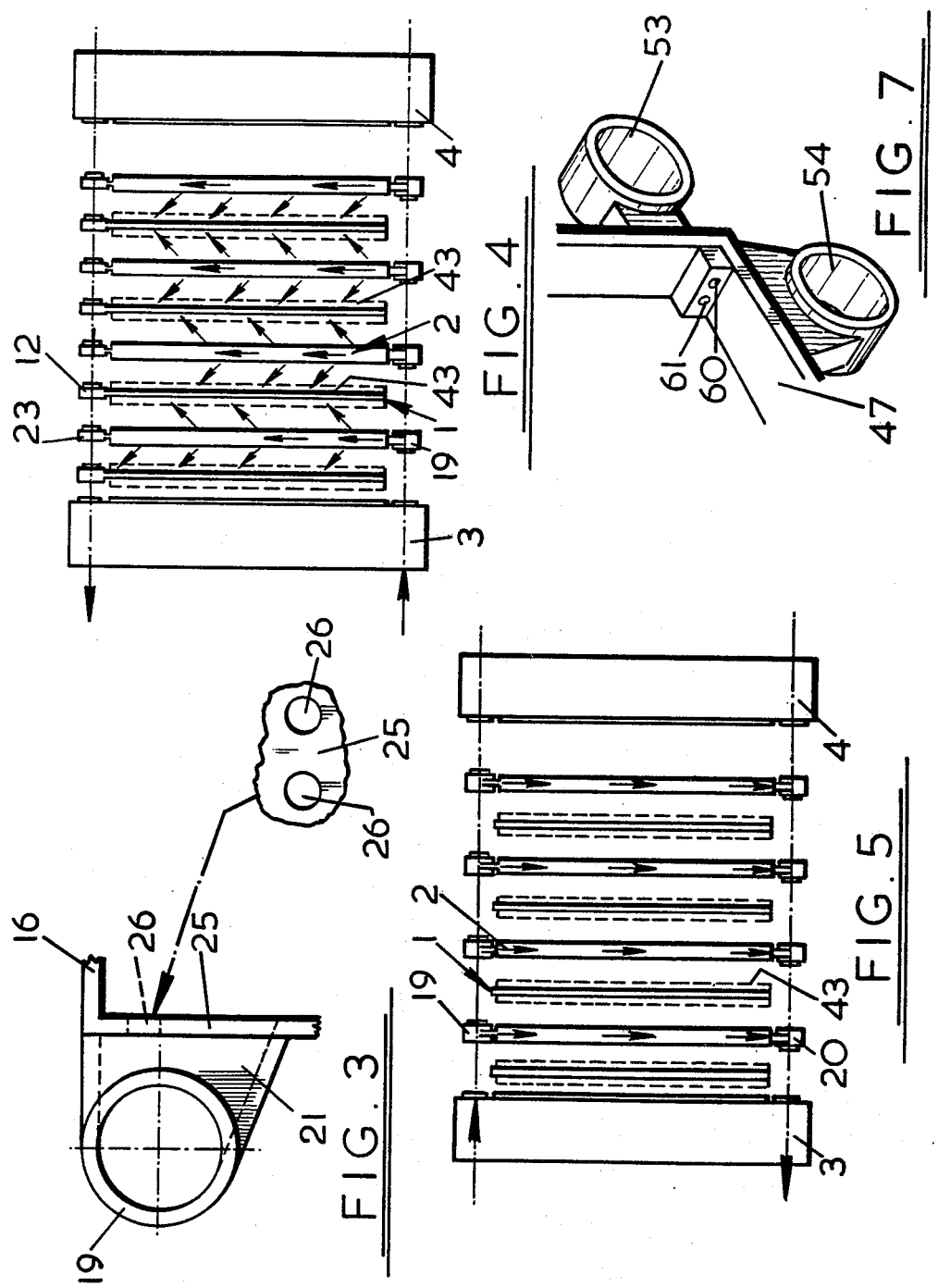

FILTER PRESSES AND A METHOD OF CLEANING SAME

The present invention relates to a method of cleaning a filter press of the plate and frame type and to such a filter press adapted to carry out said method.

In a plate and frame filter press, cleaning is usually carried out by stopping the flow of liquid to be filtered passing therethrough, draining and then opening the filter press to enable removal of the filter cake which has built up within the frames of the press between the filter plates to be carried out. The press has then to be closed and may, in certain circumstances, have to be sanitised before filtration can be recommenced.

The object of the present invention is to provide a method of cleaning a plate and frame filter press which obviates the need to open the press to remove the filter cake.

According to a first aspect of the present invention there is provided a method of cleaning a plate and frame filter press which, for filtration purposes, has two or more liquid inlets pipes and a filtrate outlet pipe, the method comprising the steps of obturating the filtrate outlet pipe, isolating one of the inlet pipes from each other inlet pipe to form out of said inlet pipes two separate channels into and out of the press, and flushing out any filtered out residue contained within the press by feeding a cleaning liquid into the press down one of said channels and recovering the liquid with the residue from the other channel.

According to a second aspect of the present invention there is provided a plate and frame filter press having, for filtration purposes, two or more liquid inlet pipes connected to a common inlet orifice and a filtrate outlet pipe, valve means being provided so that the filtrate outlet pipe can be obturated and one of the inlet pipes isolated from each other inlet pipe to form from said inlet pipes two separate channels into and out of the press whereby one of said channels can be fed with liquid via the inlet orifice and the other channel connected to drain to clean the press according to the method of the first aspect of the present invention.

The present invention will now be described by way of example with reference to the accompanying drawings in which:

FIG. 2 is a perspective view of a frame for use in the press of FIG. 1;

FIG. 3 is a elevational view to an enlarged scale of one corner of the frame shown in FIG. 2;

FIG. 4 is a flow diagram showing in plan view the path taken by liquid to be filtered through the press of FIG. 1;

FIG. 5 is a flow diagram showing in elevation the path of the cleaning liquid through the press according to the method of the present invention;

FIG. 6 is a perspective view of a frame for use in a second embodiment of a plate and frame filter press according to the present invention;

FIG. 7 is a view in the direction of arrow VII in FIG. 6;

Figure 9:
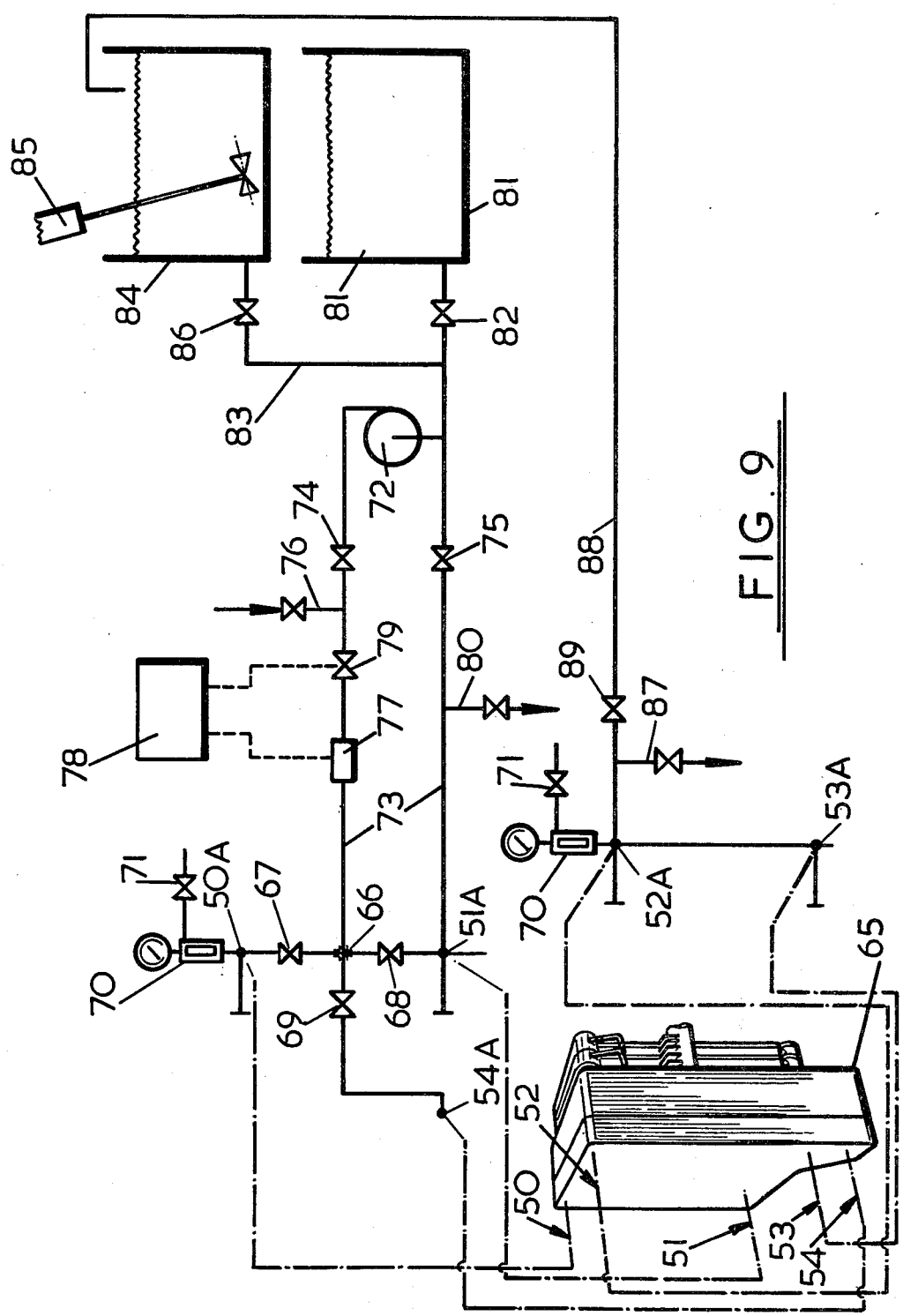

FIG. 8 is a perspective view of a frame similar to that shown in FIG. 6 in combination with a plate and a filtering sheet to illustrate the paths taken by liquid during both filtration and cleansing of the second embodiment of filter press according to the method of the present invention; and FIG. 9 is a diagram showing schematically the second embodiment of filter press along with accompanying pipework.

Figure 1:
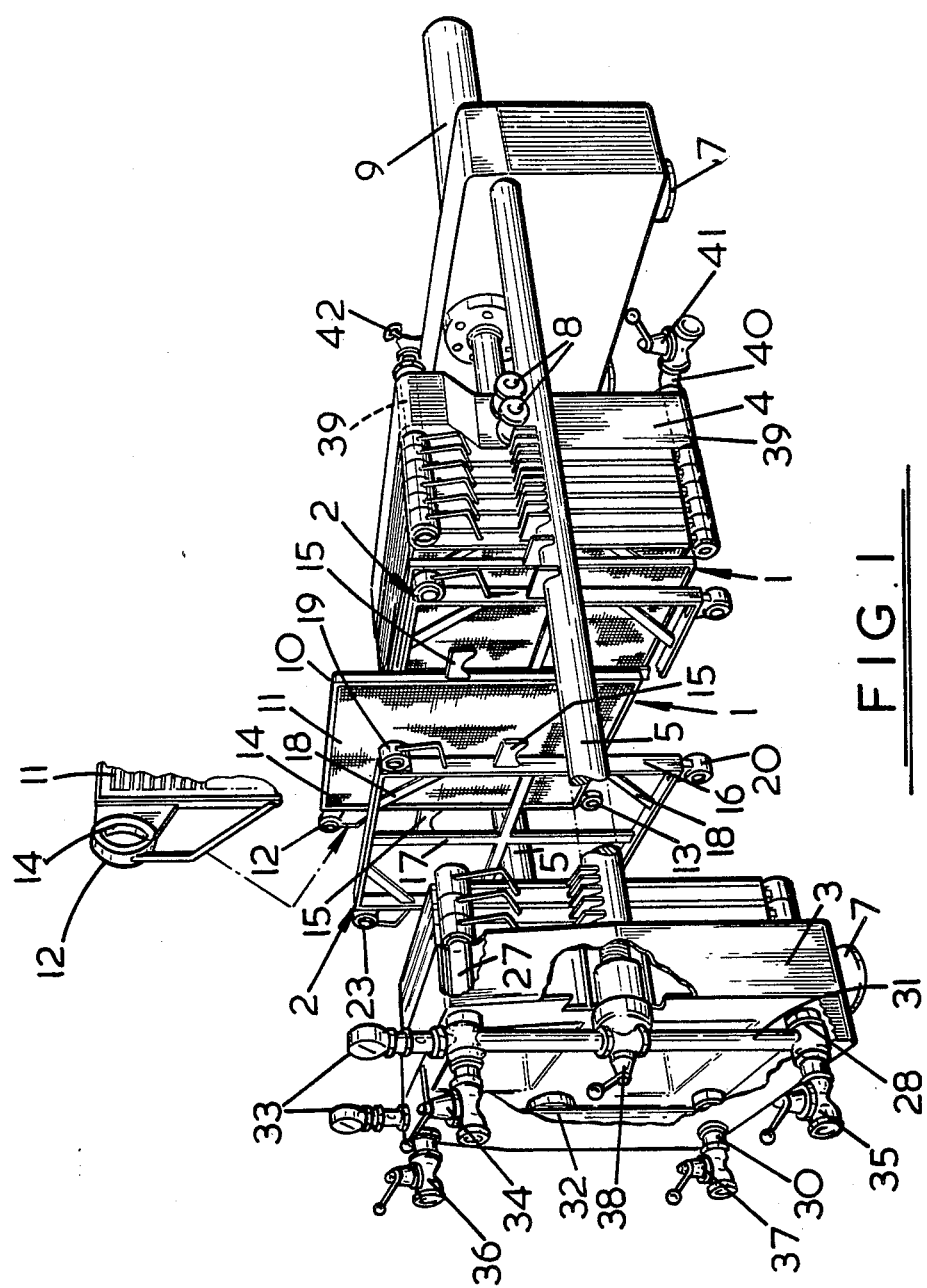
FIG. 1 is an exploded perspective view of a first embodiment of a plate and frame filter press according to the present invention with parts broken away to reveal the interior structure thereof.

A first embodiment of a plate and frame filter press according to the present invention and as shown in FIG. 1 of the drawings comprises a plurality of plates 1 and frames 2 arranged alternately between two end members 3 and 4. The plates 1 and frames 2 are supported by a pair of horizontal bars 5 which run longitudinally down each side of the press and are supported at their ends by the end member 3 and a support member 6. The end member 3 and the support member 6, in use, are adapted to remain stationary and are provided with feet 7. However, the end member 4 is adapted to move and is also supported on the bars 5 by pairs of rollers 8. In use, the end member 4 is acted on by a hydraulic ram 9 fitted to the support member 6 to press the plates 1 and frames 2 together between the end members 3 and 4 so closing the press.

Each of the plates 1 comprises a rectangular framework 10 which supports an expanded metal mesh 11. At top and bottom corners of one side of the framework are arranged eyelets 12 and 13 respectively. These eyelets 12 and 13 communicated with the interior of the framework 10 via ports 14. These ports 14 form outlet ports for the filtrate from the interior of the press as is described hereinafter. At the central region on each of the two vertical sides of the framework 10 is a laterally projecting hook 15 which supports the plate 1 on the bars 5.

The frames 2, as shown in FIGS. 2 and 3 each comprise a rectangular framework 16 which is the same size as that of the plates 1 but thicker. The framework 16 is strengthened by cross bars 17 and corner struts 18 and is also provided with hooks 15 for supporting the frame 2 on the bars 5. Each corner of the framework 16 is provided with an eyelet but only two of these 19 and 20, at one side of the framework 16 communicate with the interior of the frame 2 via ports 21 and 22 respectively. The other two eyelets 23 and 24 are adapted to interlock with the eyelets 12 and 13 respectively of the plates 1 so that in the press each of these sets of eyelets provides a pipe running along the whole length of the top or the bottom of one side of the press. Likewise the eyelets 19 and 20 are made of sufficient size that they also form two pipes respectively running along the whole length of the top and bottom of the other side of the press.

The upper port 21 of each frame 2 is provided with a baffle plate 25 which obturates the port 21 apart from the provision of two holes 26 located therein, as shown in FIG. 3. These holes 26 are arranged horizontally adjacent one another and on passage of a liquid under pressure therethrough constrain the liquid to form a pair of jets.

The stationary end member 3 comprises four pipes 27, 28, 29 and 30 arranged one at each corner thereof and these are adapted to join with the pipes formed by the eyelets in the plates 1 and frames 2. The pipes 27 and 28 and the pipes 29 and 30 are each connected together by means of vertical pipes 31 and 32 respectively and each of the pipes 31 and 32 is provided with a pressure gauge and dial 33. The pipes 27, 28, 29 and 30 are each also provided with a manually operable valve 34, 35, 36 and 37 respectively. In use, in a filtration operation the pipes 27 and 28 via the pipe 31 form inlet pipes for permitting liquid to be filtered to flow into the press. However, when the press is to be cleaned according to the method of the present invention the pipe 27 forms an inlet pipe for a cleaning liquid whereas the pipe 28 forms an outlet pipe from the press. To permit this to take place a valve 38 is provided in the pipe 31 so that the pipes 27 and 28 can be isolated from one another.

The movable end member 4 also comprises four pipes 39 each of which joins with one of the pipes formed by the eyelets of the plates 1 and the frames 2. Each of the lower pipes 39 is provided with a connecting piece 40 and is closed by a valve 41 whereby said pipe 39 can be attached to a drain pipe if necessary. The upper pipes 39 are provided with valves 42 whereby air can be bled out of the filter press as it is filled with liquid.

Referring now to FIGS. 1, 2 and 4, in use during a filtration operation, the liquid to be filtered is fed into the closed press via valve 35 and flows into the pipe 28, and the pipe 27 via the pipe 31, the valve 38 being open but the valves 34 and 37 being closed. The liquid flows along the pipes formed by the eyelets 19 and 20 in the frames 2 and flows into the frames 2 and thereby the interior of the press via the ports 21 and 22. When liquid is flowing into the press via the eyelets 19 and 20, there is no jet action of liquid through the holes 26 in the baffle plate 25. This is accomplished by ensuring that the total area of the holes 26 is equivalent to the inner cross-sectional area of the eyelets 19.

The plates 1 of the filter are adapted, in use, to be covered on both sides by filtering sheets 43. The liquid which has flowed into the frames 2 passes through the filtering sheets 43 leaving the filtered out residue behind in the frames 2. The filtrate then leaves the press via the ports 14 formed in the plates 1 and travels along the pipe formed by the eyelets 12 and 13 of the plates 1 and the eyelets 23 and 24 of the frames 2 to the pipes 29 and 30 in the end member 3. The valve 36 is open so that filtrate flows through the pipes 29, 30 and 32 and thence out of the press. The filtered residue collects within each of the frames 2 and the filtering sheets and forms a filter cake therein. The valves 41 and 42 in the movable end member 4 are kept closed at all times during filtration except when air is being bled out of the press via the valves 42.

In order to clean the press according to the method of the present invention, the flow of liquid to be filtered to the press is shut off, and the liquid in the press is displaced by a cleaning liquid, such as water. The valve 38 is closed so isolating the pipes formed by the eyelets 19 and 20 of the frames 2 from one another. The valves 36 and 37 of the stationary end member 3 and the valves 41 and 42 of the movable end member 4 are kept closed during the cleaning operation unless air is required to be bled out of the press by the valves 42. As shown in FIGS. 1 and 5, the cleaning liquid is fed into the press via the valve 34 and the pipe 27. The cleaning liquid travels along the pipe formed by the eyelets 19 in the frames 2 and passes through the holes 26 in the baffle plates 25 into the frames 2. As the liquid flows through each pair of holes 26 it is constrained to form a pair of substantially horizontal jets. In this case, liquid flows into the frames 2 only via the holes 26 so that the jet action of the liquid is effective in breaking down the filter cakes which have formed within the frames 2.

The cleaning liquid flushes the filtered residue out of the press and the liquid and the residue flows out of the frames 2 via the ports 22 in the bottom of the frames 2 and into the pipe formed by the eyelets 20 of the frames 2. The pipe 28 in the end member 3 is connected to drain via the valve 35 so that the liquid and waste residue can be disposed of.

To assist in the breaking up of the filter cakes, air may be introduced into the press and for this purpose the pipe 27 can be provided with a connection point for attachment to a compressor. The air can be introduced into the press at the same time as the cleaning fluid is being fed therein or alternately in sequence with the cleaning fluid.

In a modification, the pipe formed by the eyelets 19 of the frames 2 could be provided with an inner lining pipe which is provided with a plurality of holes opposite to the ports 21 in the frames 2. The baffle plates 25 with holes 26 is not required in this case as the holes in the lining pipe fulfil the purpose of the holes 26 and constrain liquid passing therethrough to form a jet. The advantage of the lining pipe is that it can be rotated in the eyelets 19 to swivel the liquid jet so that all parts of the frame 2 can be covered by the jet action whilst the opening and closure of the valves 34, 35, 36 and 37 has been described as a manual operation, it is desirable that they be mechanised so that they operate at appropriate times according to whether the press is in use or being cleaned. Apart from mechanisation, the operation of the valves can also be controlled by microprocessor so that efficient operation and cleaning of the press can be obtained.

A second embodiment of a plate and frame filter press according to the present invention will now be described with reference to FIGS. 6 to 9. This press is of the same basic construction as the press described above with reference to FIGS. 1 to 5 and comprises a series of alternating frames 44 and plates 45 separated by filtering sheets 46, which are supported by bars and end members as previously described. The major difference between this press and that shown in FIG. 1 is that it is provided with an additional fluid inlet channel which is also used during cleaning of the press according to the invention.

The frame 44 shown in FIGS. 6, 7, and 8 comprises a rectangular framework 47 with strengthening cross bars 48 and hooks 49 whereby the frame can be supported within the press. At each corner of the framework 47 is an eyelet 50, 51, 52 and 53 respectively but at the lower right hand corner an additional eyelet 54 is provided adjacent the eyelet 53. In a similar fashion to the frame 2 shown in FIG. 2, eyelets 50 and 51 at one side of the frame 44 communicate with the interior of the frame 44 via ports 55 and 56. The additional eyelet 54 also communicates with the interior of the frame 44 via a port 57. The eyelet 52 and 53 at the other side of the frame do not, however, communicate with the interior of the frame 44 and are intended to interlock with eyelets 58 and 59 respectively provided on the plate 45. As with the plate and frame combination described with reference to FIG. 1, the eyelets 50, 51, and 54 do not interlock with eyelets on the plates 45 but are of sufficient size to interlock with adjacent similar eyelets on the two neighbouring frames in the plate and frame series in the press to form three horizontal channels running along the length of the press.

The communication of each of the eyelets 50 and 54 with the interior of the frame 44 is via a pair of holes 60 and 61 respectively in a baffle plate. When liquid is pumped into the frame 44 via the eyelets 50 and 54, the holes 60 and 61 in the baffle plates constrain the liquid to enter the frame 44 in the form of jets.

The plate 45 shown in FIG. 8 is similar to that described above with reference to FIG. 1 and comprises a rectangular framework 62 which supports an expanded metal mesh. At the top and bottom corners of the framework 62 at one side of the plate 45 are the eyelets 58 and 59 which interlock with the eyelets 52 and 53 formed on the plate 44 to form two further horizontal channels running along the length of the press. These eyelets 58 and 59 communicate with the interior of the framework 62 via ports 63 and 64 respectively.

Referring now to FIG. 9, the inlet and outlet points for liquid into the press via the pipes formed by the eyelets 50, 51, 52, 53 and 54 in the frames 44 in combination with the eyelets 58 and 59 in the plate 45 are indicated by reference numerals 50A to 54A corresponding to the eyelets 50 and 54 respectively. The press itself comprising the series of plates 45 and frames 44 is indicated schematically by the reference numeral 65. Connected between a common 4-way inlet point 66 into the press 65 and each of the points 50A, 51A and 54A are valves 67, 68 and 69 respectively. In addition, the points 50A and 52A are each connected via a pressure gauge 70 to a standpipe and vent outlet 71 whereby the press 65 can be vented or filled with air.

A pump 72 is connected to the valve 68 by means of pipework 73. The pump 72 is flanked in the pipework 73 by two valves 74 and 75. Between the valve 74 and the inlet point 66 in the pipework 73 is located an inlet 76 for liquid to be filtered by the press 65 and downstream of the inlet 76 travelling towards the inlet point 66 is a liquid flow rate detector 77 which is connected to a flow control arrangement 78 which in turn is connected to a flow modulating valve 79 located just upstream of the detector 77 so that the rate of flow of all liquids into the press 65 can be monitored and controlled. Located between the valve 75 and the point 51A in the pipework 73 is an outlet 80 for the cleaning liquid and filtered out residue from the press 65, which outlet 80 is used during cleaning of the press 65.

A water or other cleaning liquid supply, such as a water tank 81 is connected via a valve 82 into the pipework 73 between the pump 72 and the valve 75. Between the valve 82 and the valve 75 is connected outlet pipework 83 from a tank 84 containing a liquid filter aid, such as a mixture of Kieselguhr and water, a mixer 85 being provided to keep the filter aid well mixed. A valve 86 is located in the pipework 83 to control egress of the filter aid from the tank 84.

In series with the outlet points 52A and 53A from the press 65 is an outlet 87 from the filtrate. Downstream of the outlet 87 is further pipework 88 which leads via a valve 89 to the tank 84 to return liquid thereto after having passed through the press 65.

In use of the press 65, the press 65 is first of all prepared for filtration by having water pumped therein from the tank 81 in order to vent the air therefrom. This is carried out by pumping water by means of the pump 72 from the tank 81 into the common inlet point 66 and thereby into inlet points 51A and 54A, valves 68 and 69 being open, via the pipework 73. Air is vented from the press 65 via the standpipes 70 and vents 71 by keeping the valve 67 closed to permit the air to egress from the press 65 through points 50A and 52A. In the pipework 73, valve 74 is open whereas valve 75 is kept closed and in addition valve 82 is open and valves 86 and 89 are kept closed.

Referring to FIGS. 8 and 9, the water entering the press through points 51A and 54A passes into each of the frames 44 via their eyelets 51 and 54 and passes through the filtering sheets 46 and into the plates 45. As the press 65 fills with water, air is driven out via the eyelets 50 in each of the frames 44 and passes out of the press through point 50A. The air then egresses from the pipework via the standpipe and vents 71.

Once the press 65 has filled with water, the filtering sheets 46 can be prepared for filtration by a filter aid such as Kieselguhr. This is carried out by pumping the filter aid contained in the tank 84 around the press 65 so that the sheets 46 can become coated with the filter aid. In this case the filter aid in the tank 84 is pumped by the pump 72 along pipework 83 and 73 to enter the press 65 at points 50A, 51A, and 54A via point 66, the valves 67, 68 and 69 being open. The valves 74 and 86 are also open but the valves 75 and 82 are kept closed. The water and filter aid mixture passes into each frame 44 of the press through eyelets 50, 51 and 54 and thereafter into the plates 45 through the filtering sheets 46 to coat same. The water is then returned to the tank 84 by leaving the plates 45 through their eyelets 58 and 59 and egressing from the press 65 via points 52A and 53A. Valve 89 is opened to permit the water to return along the pipework 88 to the tank 84.

Filtration can now commence in the press and the liquid to be filtered is pumped into the press 65 to replace the water therein. Once filtration is in process, the liquid to be filtered is pumped into the pipework 73 from the inlet 76 and passes into the press 65 through inlet point 66 and each of the points 50A, 51A, and 54A, the valves 67, 68 and 69 being kept open. The valves 74, 75, 82, 86 and 89 are all kept closed during filtration. Once in the press 65, the liquid to be filtered passes along the pipes formed by the eyelets 50, 51 and 54 of each of the frame 44 and enters each of the frames 44 as shown by the arrows in full lines in FIG. 8. The filtrate then passes through the filtering sheet 46 into the plates 45 and egresses therefrom via the ports 63 and 64 into the eyelets 58 and 59. Thereafter, the filtrate leaves the press 65 through the points 52A and 53A and passes to the outlet 87 for further processing. The filtered out residues is left behind in the press 65 and forms filter cakes within each of the frames 44 which periodically must be removed. This can be carried out by the following method which is similar to that described above for the first embodiment of press.

Firstly, once the filtration process has ceased, the liquid being filtered within the press is replaced by a cleaning liquid such as the water in the tank 81. The inlet 76 and the outlet 87 are closed off and then the valve 68 is closed and valves 74 and 82 are opened and water from the tank 81 is pumped into the press by the pump 82 along the pipework 73. The water now enters the press 65 through points 50A and 54A and enters each frame 44 through the eyelets 50 and 54 both of which have baffle plates with orifices 60 and 61 so that the water is constrained to form jets as it enters the frame 44. This helps to break down the filter cake contained therein as previously described. The water entering the frames 44 breaks up the filtered out residue to form a slurry which, unable to pass through the filtering sheets 46, egresses from the frames 44 via their eyelets 51 as shown in dashed lines in FIG. 8. This slurry the leaves the press 65 through point 51A and is disposed of through the outlet 80 via the pipework 73.

To assist in the break-up of the filter cake, the cleaning liquid can be pumped alternately into the top and bottom of each frame 45 via each eyelet 50 and 54. This causes a swirling action or vortex to form within each frame 44 which acts on the filter cake to break it up quickly and also clears the filter cake from the corners of the frame 44. This pulsing action is accomplished by alternately closing valves 67 and 69 as the cleaning liquid is being pumped into the press 65 so that the liquid is fed alternately to point 50A and 54A only. As described in connection with the first embodiment of press above, the breakdown of the filter cake can also be assisted by introducing a gas such as air into the press 65 at the same time as or alternately with the cleaning fluid.

To conserve the cleaning liquid during the cleaning of the press 65 the slurry itself can be pumped around the press to loosen further filter cake. This can be carried out when the press 65 is full of liquid by closing off the outlet 80 and opening the valve 75. The pump 72 then pumps the liquid in the press 65 around the circuit formed by the pipework 73 and the press 65.

After all or a substantial part of the filtered out residue has been removed from the press 65, filtration can then recommence as before without the press 65 requiring to be opened.

It will be appreciated that in order to speed the aforedescribed methods of filtration and cleaning that the operation of the valves and the pumps can be mechanised and controlled electronically, preferably in a programmable manner by a microprocessor as mentioned above according to the size of the press and the liquid being filtered.

The method and apparatus according to the invention have several advantages over those used hitherto. Firstly, the cleaning operation is fast as the press does not have to be opened for mechanical removal of the filter cakes as is required in other cleaning methods. Secondly, as the filtrate outlet pipes from the press are closed off and not used during cleaning, the filtered residue cannot pass from the "dirty" to the "clean" side of the press during cleaning to recontaminate the filtrate. In addition, the cleaning fluid cleanses the pipes formed by the eyelets 19 and 20 or 50, 51 and 54 of the press, which pipes normally form the pipes that may be contaminated. The life of the filtering sheets is also increased by cleansing of the press according to the method of the present invention as there is no possibility of damage occurring to them during cleaning because the press is not opened. This also increases the time for which the press can be used for filtration as the sheets do not have to be replaced as often as previously, which would cause the press having to be opened and cleaned.

As previously mentioned, cleaning of the press does not require the press to be opened and is faster than other methods so that the press can be used with greater flexibility as smaller batches of liquid to be filtered can be processed more economically as the press can be cleaned quickly so that greater time can be spent in actual filtration.

What is claimed is:

1. A method of cleaning a plate and frame filter press which has two or more liquid inlet pipes for receiving a liquid to be filtered and a filtrate outlet pipe for discharging filtrate during a filtering operation, the method comprising the steps of obturating the filtrate outlet pipe, isolating one of the inlet pipes from each other inlet pipe to form out of said inlet pipes two separate channels into and out of the press, and flushing out any filtrated out residue contained within the press by feeding a cleaning fluid into the press down one of said channels and recovering the fluid with the residue from the other channel.

2. A method as claimed in claim 1, in which the channels run along the entire length of the press and communicate with the interior of each of the frames of the press, and in which the liquid is not formed into a jet for said filtration purposes, the method comprising the additional step of constraining the cleaning fluid to form into a jet as it passes from said one channel into each of the frames to facilitate flushing out of the filtered residue from the press by jet action.

3. A method as claimed in claim 1, comprising the additional step of introducing a gas into said one channel at the same time as or alternately with the feeding of the cleaning fluid therein to assist in removal of the filtered residue.

4. A method as claimed in claim 1, in which the press comprises, for filtration purposes, more than two inlet pipes, two of which pipes are located at opposed sides of the press, the method comprising the additional step of isolating said two inlet pipes from each other inlet pipe to form two inlet channels through which the cleaning fluid can be fed into the press in addition to forming a third channel from said pipes through which cleaning fluid can pass out of the press.

5. A method as claimed in claim 4, comprising the additional step of isolating the said two inlet channels from each other and alternately feeding the cleaning fluid into the press via each of these channels in order to facilitate the flushing out of the filtered out residue from the press.

6. A method as claimed in claim 1, comprising the additional step of, after having filled the press with the cleaning fluid, circulating the cleaning fluid and the filtered out residue around the press via said channels to loosen any remainings residue so that it can be flushed out of the press.

7. A plate and frame filter press having, for filtration purposes, two or more liquid inlet pipes for receiving a liquid to be filtered, a common inlet manifold to which said inlet pipes are connected, a filtrate outlet pipe, and, for cleaning purposes, comprising valve means connected to said inlet pipes and said outlet pipe so that the filtrate outlet pipe can be obturated and one of the inlet pipes isolated from each other inlet pipe to form from said inlet pipes two separate channels, one into and one out of the press, means for feeding cleaning fluid into said separate channel into the press, and means for removing residue and cleaning fluid from said separate channel out of the press, whereby one of said channels can be fed with a cleaning fluid via said one inlet pipe and the other channel connected to drain to clean the press.

8. A filter press as claimed in claim 7, in which the liquid is not formed into a jet for said filtration purposes, in which the inlet pipes and thereby the channels run along the entire length of the press and communicate with the interior of each of the frames of the press via orifices, the orifices of the inlet pipe forming the channel through which the cleaning fluid is fed into the press each being covered by a baffle plate defining a hole which hole causes the cleaning fluid passing therethrough to be constrained to form a jet.

9. A filter press as claimed in claim 7, in which, for filtration purposes, more than two inlet pipes are provided, two of these inlet pipes being located at opposed sides of the press and valve means being provided whereby these two inlet pipes can be isolated both from each other and from each other inlet pipe to form two separate inlet channels for the cleaning fluid into the press and whereby a further inlet pipe can be isolated from each other inlet pipe to form an outlet channel for the cleaning fluid out of the press.

10. A filter press as claimed in claim 7, in which the channel or channels for the inlet of the cleaning fluid into the press are connected via further valve means to a pump to pump the cleaning fluid into the press.

11. A filter press as claimed in claim 10, in which a first tank to hold cleaning fluid is connected to the pump via valve means.

12. A filter press as claimed in claim 10, in which a second tank to hold a filter aid is connected to the pump via valve means.

13. A filter press as claimed in claim 12, in which the filtrate outlet pipe is connected via valve means to pipework leading to the second tank to return filter aid thereto after the latter has passed through the press.

14. A filter press as claimed in claim 7, in which flow controller means are provided connected to said common inlet orifice whereby the rate of flow of all fluid into the press can be controlled.

15. A filter press as claimed in claim 7, in which said valve means are controlled electronically in accordance with the function being performed in the press.

* * * * *